(12) United States Patent
Yada et al.

(10) Patent No.: US 7,354,187 B2
(45) Date of Patent: Apr. 8, 2008

(54) RUBBER KNEADING MACHINE

(75) Inventors: Yasuo Yada, Yokkaichi (JP); Tatsuo Yada, Yokkaichi (JP)

(73) Assignee: Suzuka Engineering Co., Ltd., Yokkaichi-shi (JP)

( * ) Notice: Subject to any disclaimer, the term of this patent is extended or adjusted under 35 U.S.C. 154(b) by 306 days.

(21) Appl. No.: 10/519,836

(22) PCT Filed: Jul. 9, 2003

(86) PCT No.: PCT/JP03/08721

§ 371 (c)(1),
(2), (4) Date: Jan. 11, 2005

(87) PCT Pub. No.: WO2004/007165

PCT Pub. Date: Jan. 22, 2004

(65) Prior Publication Data

US 2005/0226093 A1      Oct. 13, 2005

(30) Foreign Application Priority Data

Jul. 17, 2002   (JP) .............................. 2002-208574
Jun. 25, 2003   (JP) .............................. 2003-181798

(51) Int. Cl.
*B29B 7/56* (2006.01)
(52) U.S. Cl. .................. 366/71; 366/73; 366/76.4; 366/85; 366/136
(58) Field of Classification Search ............ 366/71–73, 366/76.3, 76.4, 76.5, 83–85, 89, 136

See application file for complete search history.

(56) References Cited

U.S. PATENT DOCUMENTS 1,326,375 A * 12/1919 Spencer ....................... 366/72
2,573,825 A * 11/1951 Banovesky et al. ........... 366/71

FOREIGN PATENT DOCUMENTS

| JP | 07-237236 | | 9/1995 |
| JP | 10-138243 | * | 5/1998 |
| JP | 11-314261 | | 11/1999 |
| WO | 01/47678 | | 7/2001 |

OTHER PUBLICATIONS

Machine Generated English Translation of JP 10-138243, generated Mar. 1, 2007.*

* cited by examiner

*Primary Examiner*—David Sorkin
(74) *Attorney, Agent, or Firm*—Oblon, Spivak, McClelland, Maier & Neustadt, P.C.

(57) ABSTRACT

A rubber kneading machine obviates an operator having to touch rubber on a rotating roll surface to perform a rubber kneading operation, permits unattended operation, is intrinsically safe, improves a rubber kneading process productivity, secures stable quality of kneaded rubber, and allows a closed rubber supplying mechanism to be easily opened and exposed for easy cleaning. The rubber kneading machine includes two horizontal rolls closely disposed vertically, decelerators and variable speed motors rotating the rolls at different speeds, and a screw extruder supplying a rubber lump fed into a hopper at a proximal end to the rolls. A rubber circulating mechanism constructed mainly of a scraper and a belt conveyor, or a belt conveyor above the upper roll, feeds a rubber sheet, which has left the rolls, to the hopper. A mechanism releasing the screw extruder makes it possible to open and expose closed portions to facilitate cleaning.

13 Claims, 10 Drawing Sheets

RUBBER KNEADING MACHINE

TECHNICAL FIELD

Batch rubber kneading machines come in open type and closed type. The present invention relates to an open type rubber kneading machine adapted to perform finish kneading on rubber blocks kneaded by a closed type rubber kneading machine or to knead with an added vulcanizing agent and roll.

BACKGROUND ART

A conventionally known open type rubber kneading machine is generally a twin-roll machine. The twin-roll machine is disposed such that two roll shafts are parallel in a horizontal-plane and their rolling surfaces are close to each other. Raw material rubber is fed between rolls from above while rotatively driving the two rolls. The two rolls are rotated at different speeds while being pressed into contact so as to apply shearing action to the rubber, thereby imparting plasticizing and grinding effect. An operator manually cuts apart the rubber wound around the rolls on the operating side by a cutter and winds it up or moves it to one side of the rolls by hand so as to facilitate mixing in a batch. This is because merely applying the shearing force to the rubber wound on the rolls results in uneven kneading action in the batch.

Thus, in the aforesaid publicly known rubber kneading machine, it is possible to accomplish even mixing of rubber in a batch by cutting rubber on a pair of rolls that are horizontally and closely disposed and rotated. For an operator, however, it is unsafe to work on rubber, which unavoidably includes contact with rotating rolls. The operation involves great danger, frequently causing serious injuries of operators by getting their hands or fingers caught between the rolls.

Recently, a sheeting apparatus combining an extruder and rolls is being put to practical use to replace the aforesaid roll machine. In this apparatus, a pair of rolls is vertically disposed, and the outlet of a screw extruder is disposed closely to the rolls so as to roll rubber into a rubber sheet by the pair of rolls. This apparatus, however, merely has a function for pushing kneaded rubber into the rolls from the screw extruder to form it into a sheet by one passage through the rolls. It has been ascertained that effect of finish kneading or mixing a vulcanizing agent cannot be obtained even when a circulation belt conveyor is provided to perform circulation kneading. In a process requiring such an operation, another twin-roll machine must be installed.

As may be understood from the description above, a rubber kneading machine is required to ensure efficient kneading operation and safety. In the aforesaid twin-roll rubber kneading machine, the quality of kneaded rubber depends on kneading action and skill of individual operators. The operators manually cut loose or wind up rubber wound around the surfaces of rotating rolls. This operation is not only painstaking but extremely dangerous.

Hence, there has been a demand for making it possible to mechanically perform the operation requiring skill without human aid. No equipment capable of performing such an operation has been developed. If production equipment performing such a rubber kneading operation is developed, then it will be possible to relieve fatigue, ensure safety, and secure uniform quality by standardizing operations.

On the other hand, if a rubber kneading machine is constructed to provide efficient kneading operation and high safety required by users, then the closeness of the rubber kneading machine itself is enhanced. This would require time-consuming cleaning of the interior of the rubber kneading machine to prevent a different material from being mixed in whenever a rubber with a different composition is used. In addition, the construction would make it difficult to perform thorough visual check after cleaning.

In this respect, the conventional open type rubber kneading machine permits relatively easy cleaning, whereas it markedly lacks in safety measures for operators, since it is an open type. In the aforesaid sheeting apparatus, rolls are moved to provide a gap between a distal end of a screw and the rolls, and the rolls are moved far apart so as to scrape out remaining material from an extrusion cylinder of the screw extruder, or a hopper at the top of a proximal end of a screw is opened to inspect and clean the interior of the extrusion cylinder. It is difficult, however, to thoroughly clean the interior of the extrusion cylinder and to fully check cleaning results, because of the presence of two screws. Especially for colored food or rubber dough for pharmaceuticals, it is necessary to carry out thorough cleaning to prevent any different materials from being mixed in whenever a different color or composition is used. Hence, there has been a demand for a rubber kneading machine that permits easy cleaning of closed parts and checking of cleaning results while maintaining efficient kneading operation and high safety.

DISCLOSURE OF INVENTION

A technological object of the present invention is to provide, unlike the aforesaid conventional roll rubber kneading machine, an intrinsically safe rubber kneading machine that obviates the need for an operator to touch rubber on the surfaces of rotating rolls during a rubber kneading operation, and permits fully unattended operation, depending on the type of rubber.

Another technological object of the present invention is to provide a rubber kneading machine that makes it possible to achieve higher productivity in a rubber kneading process, stable quality of kneaded rubber, and a labor-saving process.

Yet another technological object of the present invention is to provide a rubber kneading machine that is capable of continuously performing efficient mixing and kneading operation and rolling operation with high dimensional accuracy, a screw extruder thereof being provided with a mechanism for releasing an extrusion cylinder so as to permit easy cleaning of closed parts and also easy checking of cleaning results, while maintaining high safety for operators.

A rubber kneading machine in accordance with the present invention to fulfill the aforesaid objects includes two horizontal rolls disposed vertically close to each other through the intermediary of an adjusting device for allowing the gap between an upper roll and a lower roll to be freely adjusted, rotatively driving means for rotating the rolls, and a screw extruder for supplying a rubber lump fed into a hopper at a proximal end to the rolls, wherein a circulating mechanism for kneading and mixing rubber that is formed by feeding a rubber sheet that has left the rolls to the hopper is constructed of a FFFFFwinding control means for selectively winding the rubber sheet onto the upper roll by differentiating the rotational speeds of the upper and lower rolls by a variable speed motor or a decelerator, and a carrying means for sending the rubber sheet peeled from the upper roll to the hopper.

A conveyor can be used as the carrying means in the rubber kneading machine. In this case, the belt conveyor is hung over the upper roll so as to guide a sheet from the rubber rolls onto the belt conveyor to feed it to the hopper.

As the carrying means, a scraper that is in contact with the upper roll at an upper level thereof, peels a rubber sheet wound thereon, and guides it to the hopper may be used. Furthermore, the carrying means may be constructed of a scraper that is in contact with the upper roll at an upper level thereof to peel off a rubber sheet wound thereon, and a conveyor for feeding the rubber sheet peeled by the scraper to the hopper.

In the rubber kneading machine having the aforesaid construction, a rubber lump fed into the hopper of the screw extruder is supplied between the upper and lower rolls by the screw extruder, rolled between these rolls, and sent out as a rubber sheet toward the side of the rolls opposite from the screw extruder. The rubber sheet is guided to the hopper of the extruder by the winding control means and the carrying means for the rubber sheet that constitute the rubber circulating mechanism, and then supplied again to the pair of rolls by the screw extruder.

As the carrying means, the aforesaid scraper, conveyor, or the like may be used. The rubber sheet rolled between the pair of rolls can be wound around the upper roll by setting a proper rotational speed by a variable speed driver connected to the upper roll and/or lower roll and by setting a proper difference in temperature between the upper and lower rolls. The rubber sheet is peeled from the roll by a scraper or the like and guided to the hopper of the screw extruder, or carried to the hopper by the conveyor or the like hung on the upper roll and fed to the rolls again. This operation is repeated to circulate the rubber, thus making it possible to secure stable quality of kneaded rubber.

After the circulation of rubber is started, the rubber kneading speed can be considerably increased by increasing the rotational speed of the rolls and the driving speed of the screw extruder. Differentiating the rotational speeds (numbers of revolutions) of the upper and lower rolls is effective not only for selecting the winding onto the upper roll but for kneading passing rubber while applying shearing action thereto also.

The rubber kneading machine having such a mechanism enables an operator to apply mechanical kneading action to rubber simply by performing easy and safe operation, such as only monitoring the machine or placing a leading end of a rubber sheet coming out of the pair of rolls onto the conveyor, so that the operator hardly touches rubber during the operation. Upon completion of kneading, the rubber sheet adhering to the upper roll and transferred toward the screw extruder is cut on the upper roll in the direction of the roll axis at the outlet side from the upper and lower rolls, and at the same time, the upper and lower rolls are synchronously rotated. This causes the rubber sheet to come off the upper roll. Hence, providing a receiving conveyor under the lower roll allows the rubber sheet to be fed onto the conveyor, so that it can be carried out of the system.

Especially because the operating side where an operator touches rubber during the operation is the side where a rubber sheet comes out from the pair of rolls, there is no danger of the operator fingers or hands being caught between the rolls. This makes the mechanism intrinsically safe.

In the rubber kneading machine described above, the screw extruder has two tapered screws that mesh each other and rotate, and an extrusion cylinder accommodating the two screws. Preferably, the extrusion cylinder has an elliptical or gourd-shaped section and is tapered in its axial direction.

In the rubber kneading machine, a horizontal rubber fall preventing plate in contact with the lower roll is provided between the upper and lower rolls and the distal end of a collet of the screw extruder. Walls are vertically provided on both sides of the rubber fall preventing plate so that the interval therebetween can be set freely. The space formed between the walls is used as a rubber reservoir, and a detector for detecting the amount of rubber in the reservoir is provided at an upper level of the rubber reservoir. Based on the amount of rubber in the reservoir detected by the detector, the numbers of revolutions of the screws can be adjusted.

It is effective to use the space formed by vertically installing the walls on both sides of the rubber fall preventing plate as a rubber compression passage, and a rotative plate for setting the sectional area of the rubber compression passage is provided at an upper level of the space such that it is in contact with the walls on both sides and its position is vertically adjustable so as to form a rubber lump into a sheet, which is supplied to the rolls. In this case, it is proper to provide, in the rubber reservoir formed at the outlet side of the rotative plate, a detector for detecting the amount of rubber in a rubber reservoir to make the numbers of revolutions of the screws adjustable on the basis of the amount of rubber in the reservoir detected by the detector, and to make an arrangement so as to permit banking of rubber in the space.

These arrangements allow rubber to be rotated or kneaded in the rubber reservoir, so that kneading effect can be enhanced.

In a preferred form of the present invention, an extrusion cylinder accommodating the screws in the screw extruder is constructed such that it can be attached to and detached from the screw extruder main body including the screws and a driving mechanism thereof, and roll frames supporting the upper and lower rolls and the distal end of the extrusion cylinder are constructed to be removable. A driving mechanism may be provided to drive the roll frames and the extrusion cylinder toward or away from each other, and to drive the extrusion cylinder and the screw extruder main body toward or away from each other.

In this case, it is proper to provide clamps for removably fastening the extrusion cylinder to the roll frames and the screw extruder main body, make it possible to drive the driving mechanism in a direction for moving the roll frames and the screw extruder main body toward or away from each other, dispose the screw extruder main body and a direct acting machine constituting the driving mechanism on a base, secure the frames on a carriage connected to the direct acting machine, and support the extrusion cylinder such that it can be moved on the carriage in the direction in which the frames are moved.

With this arrangement, if the extrusion cylinder is secured to the roll frames with the clamps, while the clamps between the extrusion cylinder and the screw extruder main body are removed to drive it away from the screw extruder main body by the driving mechanism, then the screws are drawn out of the extrusion cylinder. Meanwhile, if the clamps between the extrusion cylinder and the roll frames are removed, while the extrusion cylinder and the screw extruder main body are clamped, and the driving mechanism is driven in the similar manner, then the roll frames move away from the screw extruder. In other words, the screws can be inserted in and moved out of the extrusion cylinder and the roll frames and the screw extruder can be moved toward or away from each other by the single driving mechanism.

Furthermore, in the rubber kneading machine, it is possible to configure a mechanism in which, at the rubber outlet side of the upper roll, a retaining seat is provided for a cutter that is pressed into contact with the roll and slidable with respect to the roll surface so as to cut rubber in a parallel direction. In this case, it is effective to provide a mechanism for pressing the cutter into contact with the roll by a pneumatic cylinder for adjusting the travel in a roll gap and the level of pressure of contact to the roll surface.

The rubber kneading machine constructed as described above allows the rolls and the distal end of the extrusion cylinder to be cleaned easily and securely by moving the roll supporting frames and the extrusion cylinder away from each other, or allows the interior of the extrusion cylinder and the screws to be cleaned easily and securely by moving the extrusion cylinder and the screw extruder main body away from each other to expose the screws when, for example, changing the color or composition of a rubber dough, while maintaining high safety for an operator by its high level of closure.

The rubber kneading machine in accordance with the present invention described in detail above is intrinsically safe, because the rubber sheet outlet side of the rolls (the side where rolls 1 and 2 mesh each other and do not rotate) is the operating side, which is different from a conventional roll rubber kneading machine. Moreover, the rubber circulating mechanism that includes the carrying means for sending a rubber sheet sent out from between the upper and lower rolls to the hopper of the screw extruder is provided, so that an operator does not have to touch rubber on a rotating roll surface in performing a rubber kneading operation. Depending on the type of rubber, completely unattended operation is possible.

The kneading effect in the rubber kneading machine according to the present invention is marked particularly when the rotational speeds of the upper and lower rolls are differentiated. This arrangement applies high shearing to rubber passing through the upper and lower rolls. Properly setting the rubber reservoir formed in the valley between the distal end of the collet of the screw extruder and the rolls causes the rubber to rotate, leading to enhanced kneading effect.

Figure 12:
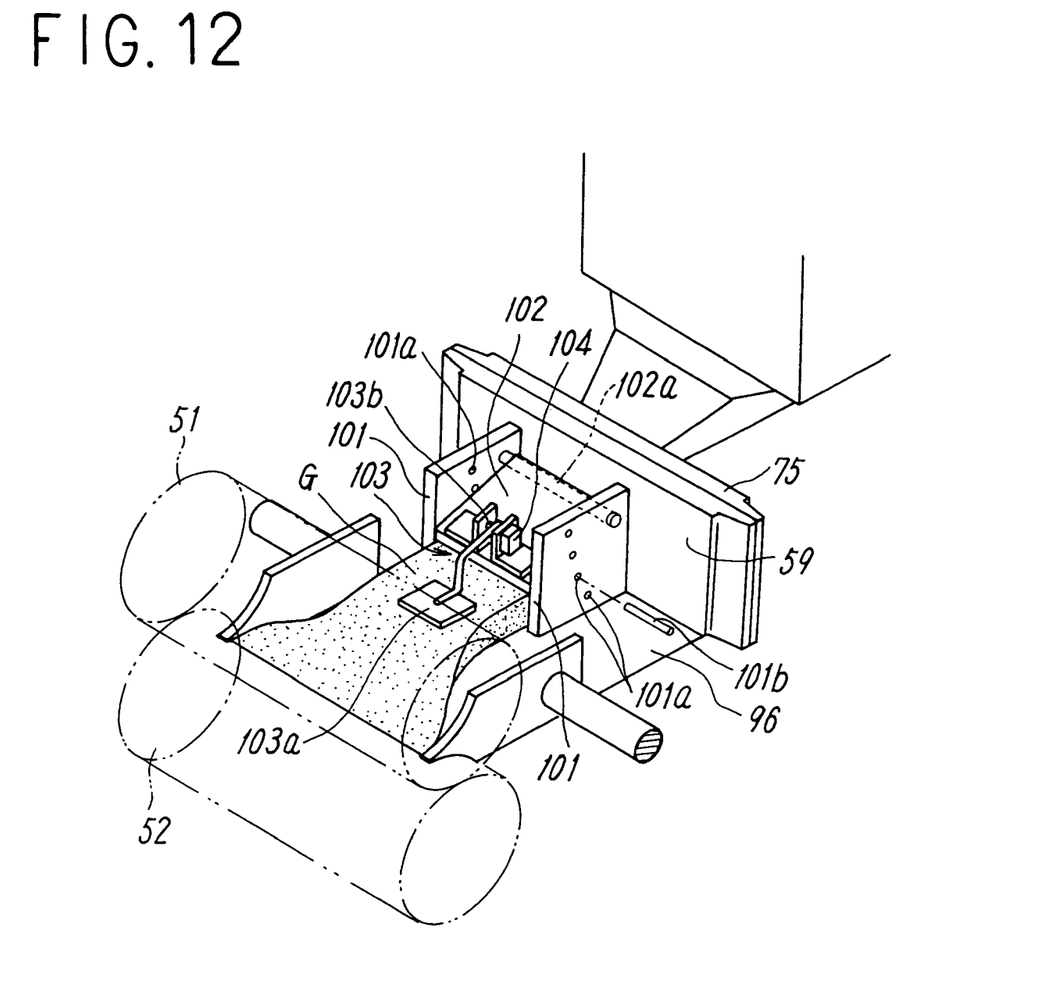
FIG. 12 is a perspective view of an essential section showing a construction of a third embodiment of the present invention.

Marked mixing and kneading effect is obtained by lowering the position where the rotative plate is fixed at the distal end of the collet of the screw extruder to feed a sheet-like rubber between the upper and lower rolls, as shown in a third embodiment.

Thus, it is possible for the rubber kneading machine according to the present invention to provide production equipment that permits improved productivity of a rubber kneading process, stable quality of kneaded rubber, safe operation, and laborsaving to be achieved.

Furthermore, the extrusion cylinder accommodating the screws in the screw extruder is removably installed to the screw extruder main body, the frames supporting the upper and lower rolls and the distal end of the extrusion cylinder are removable, and the driving mechanism is provided to drive the frames and the extrusion cylinder away from each other alternately or simultaneously, and to drive the extrusion cylinder and the screw extruder main body alternately or simultaneously away from each other. This arrangement allows the rolls and the distal end of the extrusion cylinder to be cleaned easily and securely. The interior of the extrusion cylinder and the screw can be cleaned easily and securely by moving the extrusion cylinder and the screw extruder main body apart from each other to expose the screws.

BEST MODE FOR CARRYING OUT THE INVENTION

Figure 1:
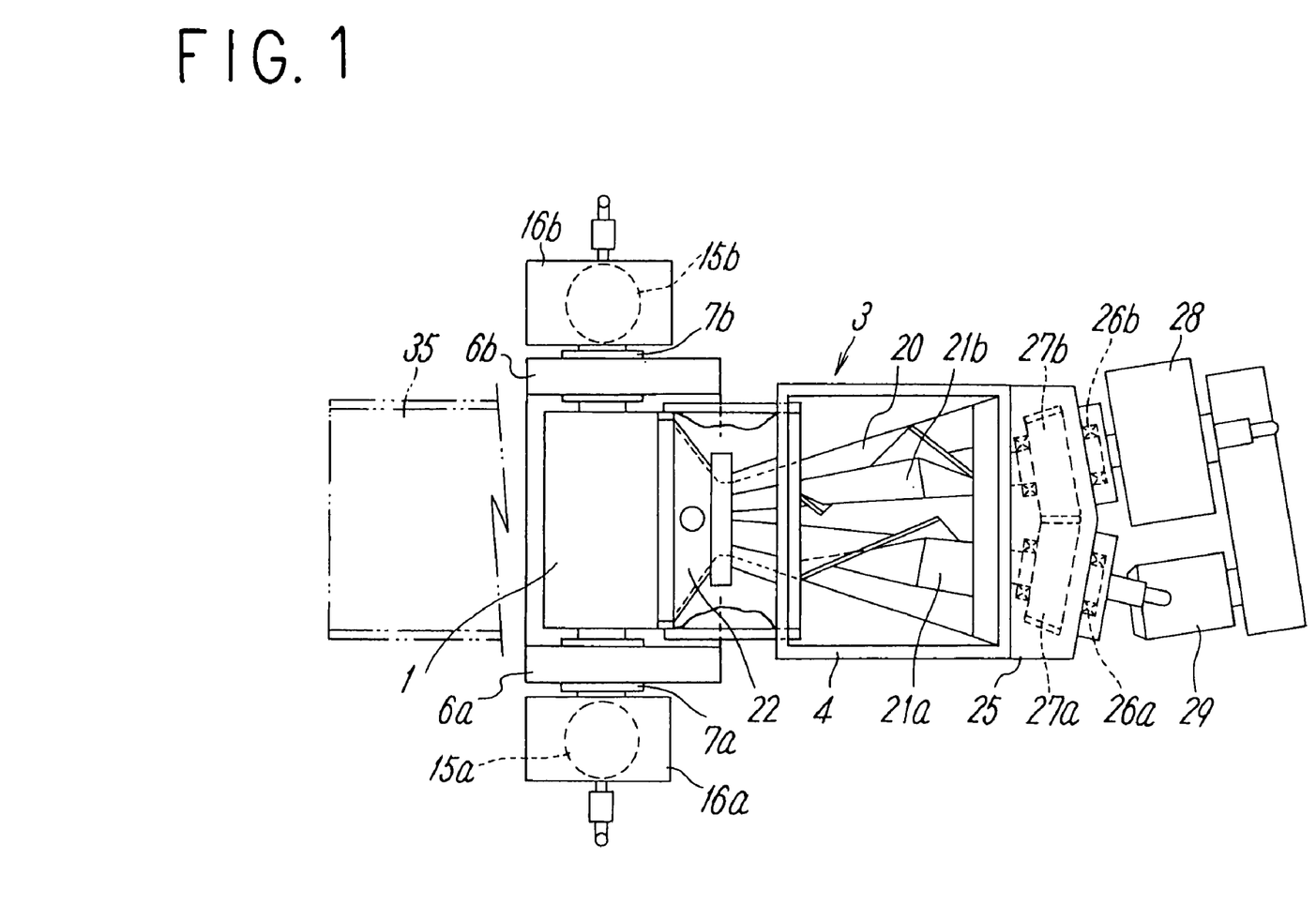
FIG. 1 is a plan view of a rubber kneading machine according to a first embodiment of the present invention.
Figure 2:
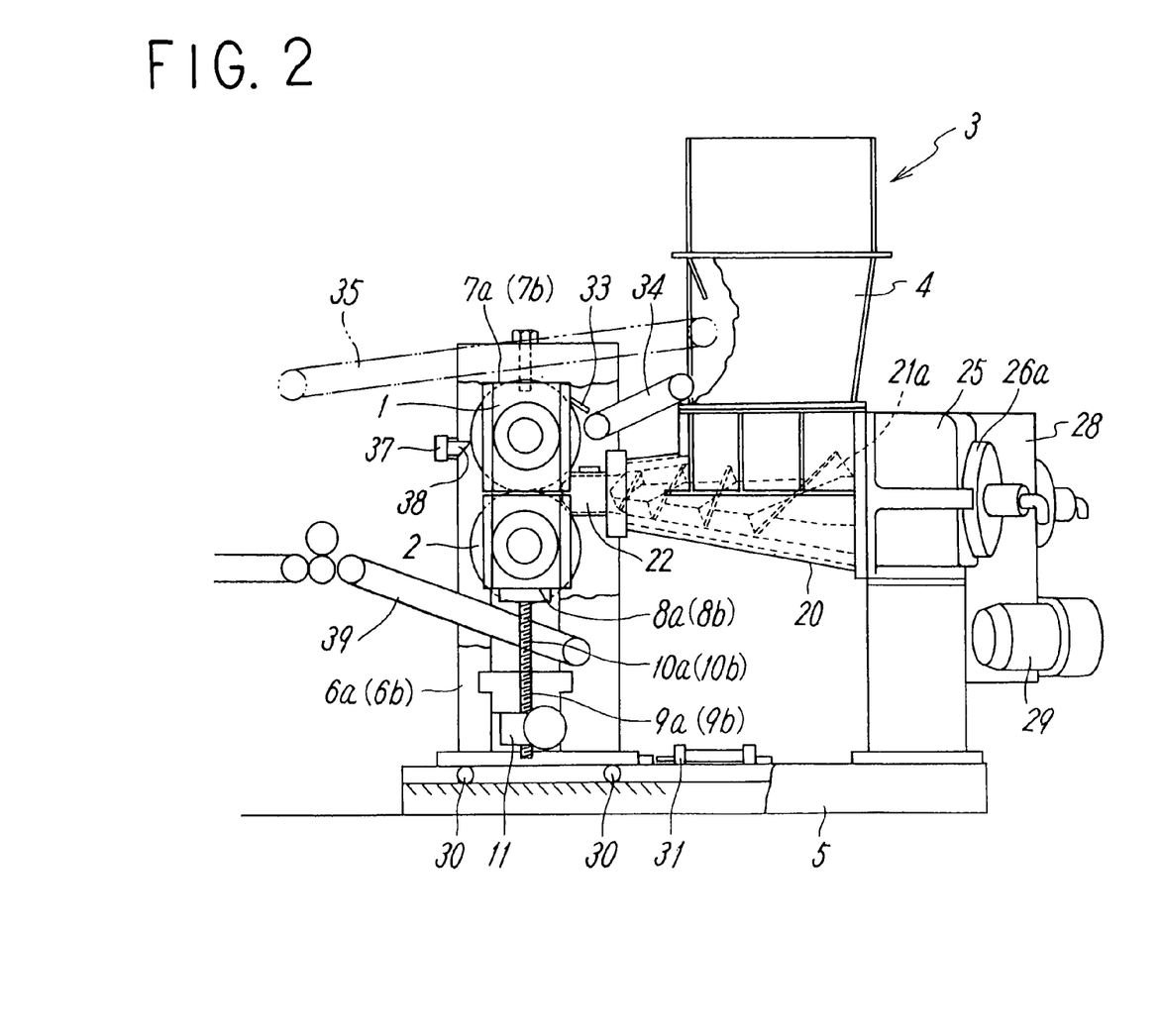
FIG. 2 is a partial cutaway front view of the rubber kneading machine.

FIG. 1 and FIG. 2 show a first embodiment of a rubber kneading machine in accordance with the present invention. The rubber kneading machine is basically provided with two horizontal rolls 1 and 2 disposed vertically close to each other and a screw extruder 3 for supplying a rubber lump fed into a hopper 4 to the rolls 1 and 2.

The upper roll 1 and the lower roll 2 are vertically disposed so that they are parallel to each other between a pair of left and right frames 6a and 6b provided on a base 5, and bearings 7a, 7b and 8a, 8b of both axial ends are supported by the frames. The bearings 7a and 7b of both axial ends of the upper roll 1 are fixedly supported by the frames 6a and 6b. The bearings 8a and 8b receiving both axial ends of the lower roll 2 are retained by the frames 6a and 6b, respectively, such that they are free to move up and down, and distal ends of screws 10a and 10b threadedly inserted in female screws 9a and 9b provided at bottoms of the frames 6a and 6b are abutted against bottom surfaces thereof to support them. The screws 10a and 10b are rotatively driven by driving devices 11 provided on the frames. These components constitute a gap adjusting mechanism for arbitrarily adjusting the gap between the paired rolls 1 and 2 by moving the lower roll 2 up or down.

Meanwhile, the shafts of the upper roll 1 and the lower roll 2 are connected to variable speed motors 15a and 15b, through the intermediary of decelerators 16a and 16b, as the means for rotatively driving the rolls. The rolls are rotatively driven in the direction for chewing rubber fed from the screw extruder 3. Furthermore, the number of revolutions of the upper and lower rolls 1 and 2 can be arbitrarily set independently in the variable speed motors 15a and 15b or the decelerators 16a and 16b.

Alternatively, however, a single motor connected to the upper roll 1 or the lower roll 2 may be used to cause the other roll to be rotated through the intermediary of a gear or the like, which is not shown. In this case, however, it is necessary to arbitrarily set the numbers of revolutions of both rolls independently in the decelerators connected to the shafts of the respective rolls.

The screw extruder 3 is equipped with two tapered screws 21a and 21b that mesh each other and rotate and an extrusion cylinder 20 accommodating the screws. The extrusion cylinder 20 has an elliptical or a gourd-shaped section, and is tapered in the axial direction, a collet 22 at the distal end being disposed between the upper roll 1 and the lower roll 2 disposed closely to each other. The hopper 4 widely opened upward for receiving large rubber blocks to be kneaded is provided at the proximal end of the extrusion cylinder 20.

Conical gears 27a and 27b that intermesh with their screw shafts in a case 25 and rotatively supported by bearings 26a and 26b are provided at the proximal ends of the two screws 21a and 21b that project out of the extrusion cylinder 20. A shaft end of the screw 21b is connected to a motor 29 through the intermediary of a decelerator 28.

The driving speed of the screw extruder 3 is arbitrarily adjustable by the motor 29 or the decelerator 28.

In the screw extruder 3 having the construction above, when the screw 21b is rotatively driven through the decelerator 28 by the motor 29, the screw 21a is rotatively driven through the intermediary of the conical gears 27a and 27b. This causes a rubber lump supplied into the hopper 4 to be fed between the upper and lower rolls 1 and 2 through the collet 22 at the distal end of the extrusion cylinder 20.

The frames 6a and 6b are movably supported, on the base 5, in a horizontal direction orthogonal to the axes of the rolls 1 and 2 through the intermediary of a plurality of rolling wheels 30, so that they can be moved by a roll moving device 31. This arrangement allows the pair of rolls 1 and 2 to be moved in relation to the screw extruder 3. Preferably, the distance between the distal end of the collet 22 and the rolls 1 and 2 is properly set to provide a space for forming an appropriate rubber reservoir therebetween, which will be discussed hereinafter.

A scraper 33, which is parallel to the upper roll 1 and has its distal end in contact with the upper roll 1, is provided at an upper level of the upper roll 1 that is adjacent to the screw extruder 3. The scraper 33 peels a rubber sheet off of the upper roll 1. As a carrying means for guiding the peeled rubber sheet into the hopper 4, a belt conveyor 34 is provided, the belt conveyor 34 extending from below the scraper 33 to the upper edge of the hopper 4. If, however, the scraper 33 itself has a function for guiding the peeled rubber sheet to the hopper 4, then the scraper can be used also as the carrying means. This obviates the need for providing the belt conveyor 34.

In place of or in addition to the scraper or the like, a belt conveyor 35 may be suspended as the carrying means for carrying rubber sheets, which have been rolled and pushed out from the upper and lower rolls 1 and 2, back into the hopper 4. As indicated by the chained line in the drawing, the belt conveyor 35 extends from the rubber sheet outlet side at above the upper roll 1 to the hopper 4 via above the screw extruder 3.

In the upper roll 1, at the side opposite from the screw extruder 3, a retaining seat 37 of a cutter 38 is provided such that it is slidably moved in parallel to the roll axes by a slide driving mechanism. The cutter 38 is arranged such that it is projected from and retracted into the retaining seat 37 by a pneumatic cylinder, which is not shown. Upon completion of kneading, a rubber sheet coming out from between the upper and lower rolls adheres to the upper roll 1 and transferred toward the screw extruder 3. The rubber sheet is cut by the cutter 38 in the direction orthogonal to the direction in which the rubber sheet runs, thus peeling the rubber sheet from the upper roll 1. Preferably, the upper and lower rolls are synchronously rotated when cutting the rubber sheet by the cutter 38.

As a carrying mechanism for carrying the rubber sheet, which has been peeled off of the upper roll 1, out of the system, a belt conveyor 39 for taking out is provided under the lower roll 2. The rubber sheet coming off of the upper roll is transferred onto the belt conveyor 39, permitting the rubber sheet to be easily carried out of the system.

In the rubber kneading machine having the construction described above, a rubber lump fed into the hopper 4 of the screw extruder 3 is supplied between the upper and lower rolls 1 and 2, rolled between the rolls, and pushed out in the form of a rubber sheet to the side of the rolls opposite from the screw extruder 3. The rubber sheet is guided to the hopper 4 of the screw extruder 3 by the carrying means constituting the rubber circulating mechanism, namely, the scraper 33 and the belt conveyor 34, or the belt conveyor 35 or the like above the upper roll 1, and supplied back to the pair of rolls 1 and 2 by the screw extruder 3. The circulation of such rubber makes it possible to secure stable quality of kneaded rubber.

In the above rubber kneading machine, the number of revolutions of the upper and lower rolls 1 and 2 can be independently set at desired values. Hence, the number of revolutions of the upper and lower rolls 1 and 2 can be properly selected to apply sufficient shearing to the rubber passing between the upper and lower rolls 1 and 2 by the difference in the number of revolutions between the rolls. This arrangement makes it possible to enhance the kneading effect and to set conditions or the like advantageous for winding rubber sheets around the upper roll 1 to guide them to the hopper 4.

Depending on the type of rubber, rubber sheets wind onto the upper roll 1 when the upper roll 1 is set to run faster than the lower roll 2. If a rubber includes a natural rubber, then a sheet of the rubber winds around upper roll 1 by setting the upper roll 1 to be slower than the lower roll 2 and the temperature thereof slightly higher than that of the lower roll.

Upon completion of kneading, the rubber sheet on the upper roll 1 is cut in parallel to the roll axis by the cutter 38, and at the same time, the upper and lower rolls are synchronously rotated to fall the rubber sheet onto the takeout belt conveyor 39 disposed under the lower roll 2 so as to carry it out of the system, as described above.

With the rubber kneading machine having the aforesaid mechanism, an operator has only to do a simple, safe operation, such as merely monitoring the machine or placing the leading edge of a rubber sheet coming out of the pair of upper and lower rolls 1 and 2 onto the belt conveyor 35 or the belt conveyor 39, in order to apply mechanical kneading action to rubber. Thus, the operator hardly touches rubber.

Especially because the operating side where an operator is likely to touch rubber during the operation is the side where a rubber sheet comes out from the pair of rolls, there is no danger of the operator fingers or hands being caught between the rolls, making the mechanism intrinsically safe.

Figure 3:
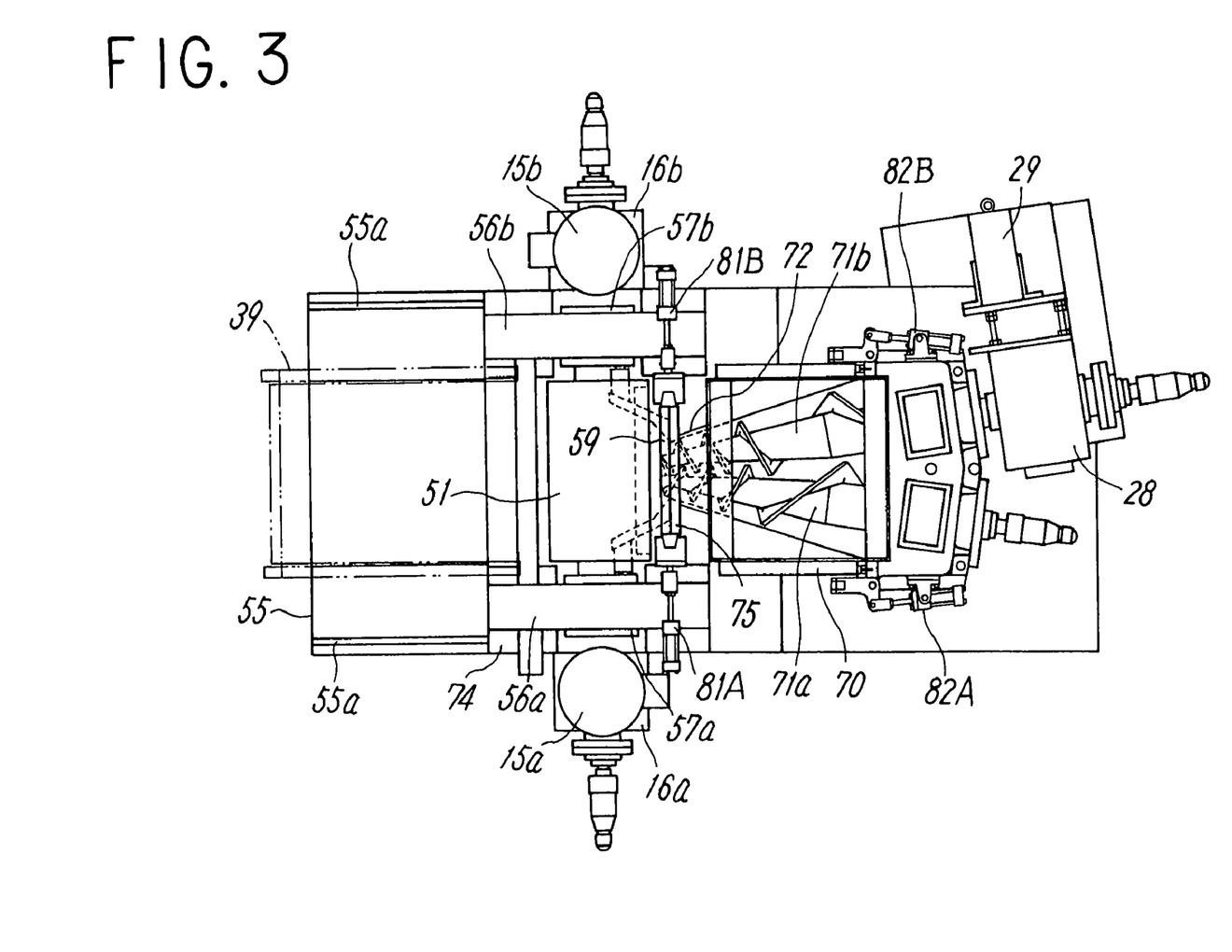
FIG. 3 is a plan view of a rubber kneading machine according to a second embodiment of the present invention.
Figure 4:
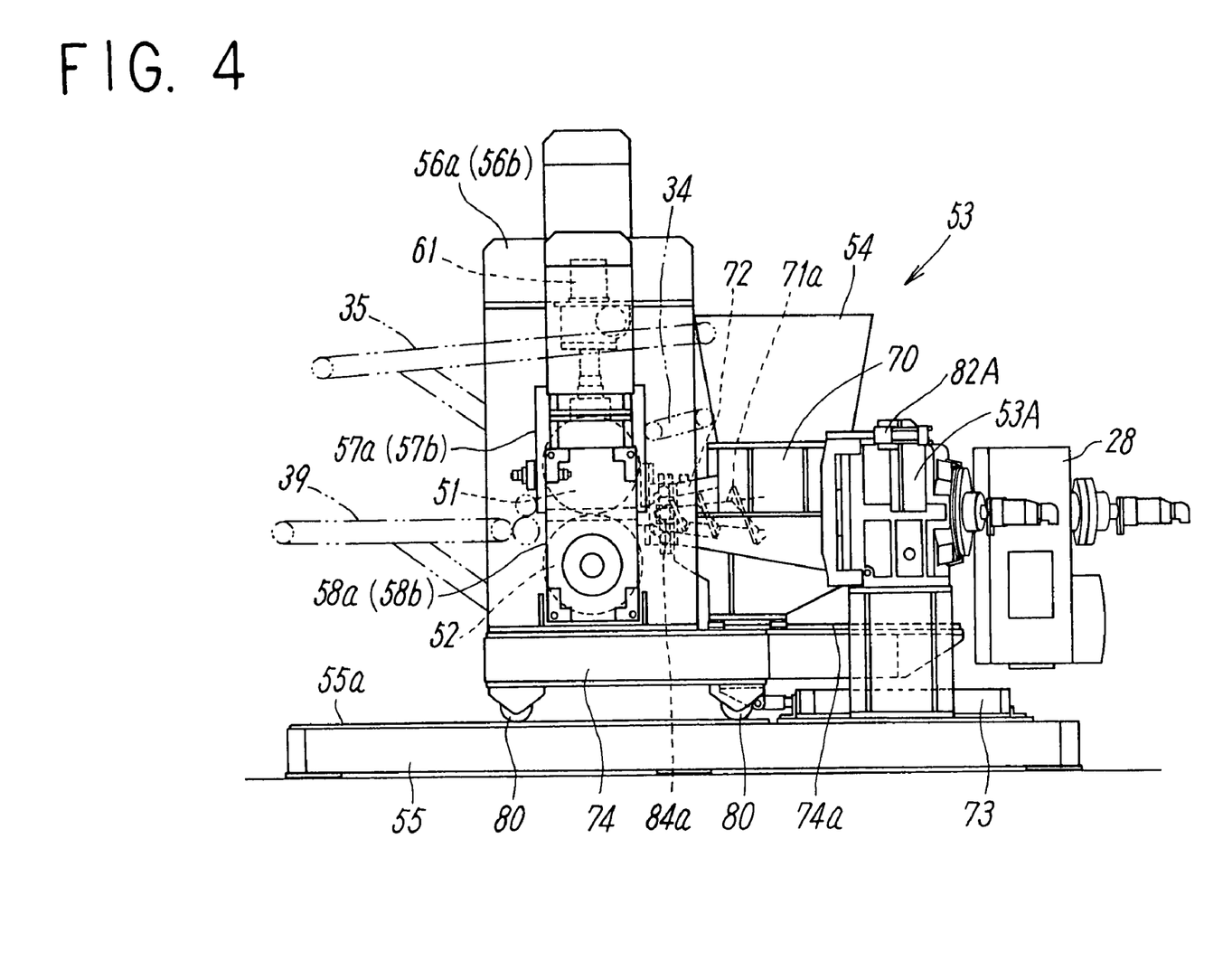
FIG. 4 is a partial cutaway front view of the rubber kneading machine.
Figure 5:
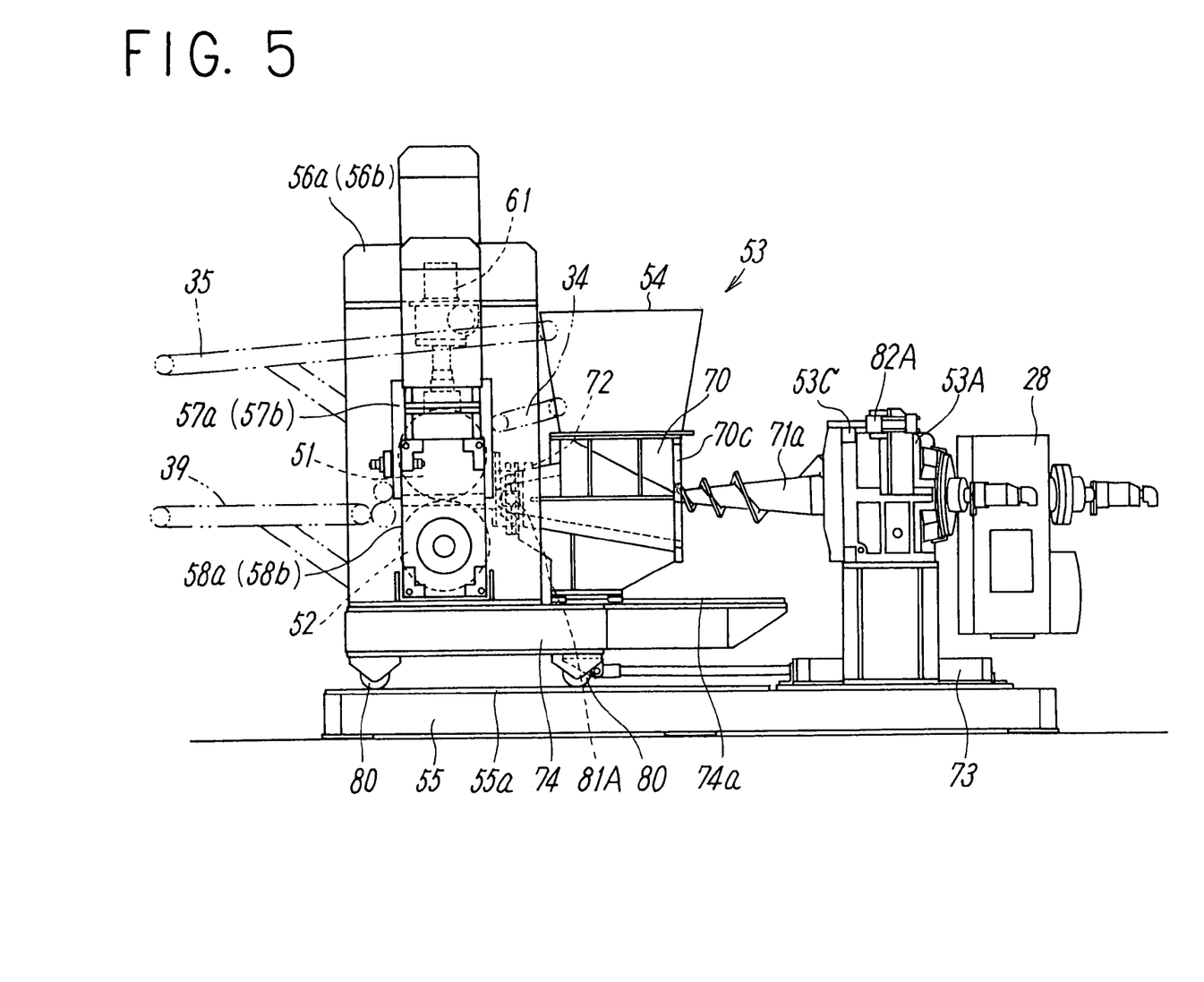
FIG. 5 is a partial cutaway front view showing a state wherein screws of the rubber kneading machine has been drawn out of an extrusion cylinder.
Figure 6:
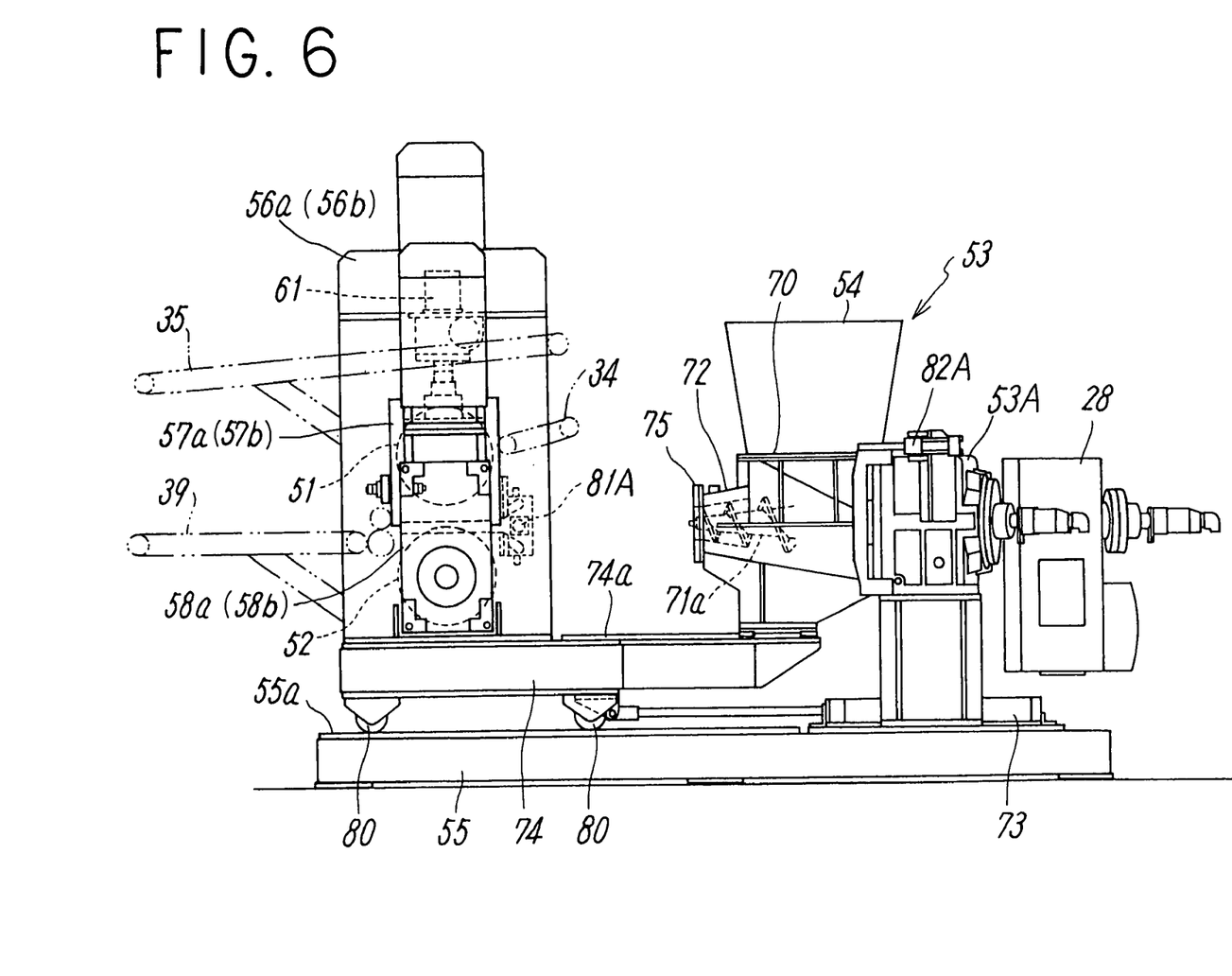
FIG. 6 is a partial cutaway front view showing a state wherein a gap is produced between frames and the extrusion cylinder of the rubber kneading machine.

FIG. 3 through FIG. 11 illustrate a second embodiment of the rubber kneading machine according to the present invention. The rubber kneading machine has the same basic construction as that of the first embodiment. As shown in FIG. 5 and FIG. 6 in detail, in the second embodiment, a screw extruder 53 for supplying a rubber lump in a hopper 54 to rolls 51 and 52 is constructed such that an extrusion cylinder 70 accommodating screws 71a and 71b, and a screw extruder main body 53A that includes the screws 71a and 71b and a driving mechanism therefor can be separated and detachably fastened by clamps, which will be discussed hereinafter. Furthermore, a pair of left and right frames 56a and 56b integrated to support the upper and lower rolls 51 and 52 through the intermediary of bearings 57a, 57b and 58a, 58b, and a collet 72 at the distal end of the extrusion cylinder 70 are constructed to be detachable. The frames 56a, 56b and the extrusion cylinder 70 can be driven toward or away from each other, and the extrusion cylinder 70 and the screw extruder main body 53A can be driven toward or away from each other by a hydraulic cylinder 73 constituting a driving mechanism, which will be discussed hereinafter.

Both bearings 58a and 58b of the lower roll 52 are fixedly supported by the frames 56a and 56b, while the bearings 57a and 57b receiving both shaft ends of the upper roll 51 are retained by the frames 56a and 56b such that they are free to move up and down. This constitutes an interval adjusting mechanism for arbitrarily adjusting the interval between the pair of rolls 51 and 52 by moving the upper roll 51 up or down by a driving device 61 provided on the frames.

To be more specific, in the rubber kneading machine, the screw extruder main body 53A and the hydraulic cylinder 73 constituting the driving mechanism are fixed on a base 55, and the frames 56a and 56b supporting the upper and lower rolls 51 and 52 are fixed on a carriage 74 connected to the hydraulic cylinder 73. The carriage 74 is supported, through the intermediary of a plurality of rolling wheels 80, on a rail 55a laid on the base 55 such that it is free to travel in a horizontal direction orthogonal to the axes of the rolls 51 and 52. The extrusion cylinder 70 is supported such that it is free to travel on a rail 74a laid on the carriage 74 in a direction in which the frames 56a and 56b travel.

Furthermore, two pairs of clamps 81A, 81B (FIG. 7) and 82A, 82B (FIG. 3, FIG. 8 and FIG. 9) are provided on the surfaces of the frames 56a, 56b and the screw extruder main body 53A, which face the extrusion cylinder 70, to detachably fasten the extrusion cylinder 70 to the frames 56a, 56b and the screw extruder main body 53A, respectively. When the clamps 81A, 81B or the clamps 82A, 82B are removed, the frames 56a, 56b and the screw extruder main body 53A can be moved toward or away from each other by driving the hydraulic cylinder 73. The rail 55a on the base 55 and the rail 74a on the carriage 74 are extended, the clamps 81A and 81B are released, the hydraulic cylinder is advanced, the clamps 82A and 82B are released at a position where a stop sensor (not shown) is actuated, and the hydraulic cylinder is further traveled forward to a forward limit. This allows the extrusion cylinder 70 to be separated from the frames 56a, 56b and the screw extruder main body 53A at the same time.

The aforesaid driving mechanism is not limited to the one constructed of the hydraulic cylinder 73 described above. Alternatively, a direct acting machine constructed of a mechanical direct power transmitting means, such as a screw rack pinion or the like, may be used.

Figure 7:
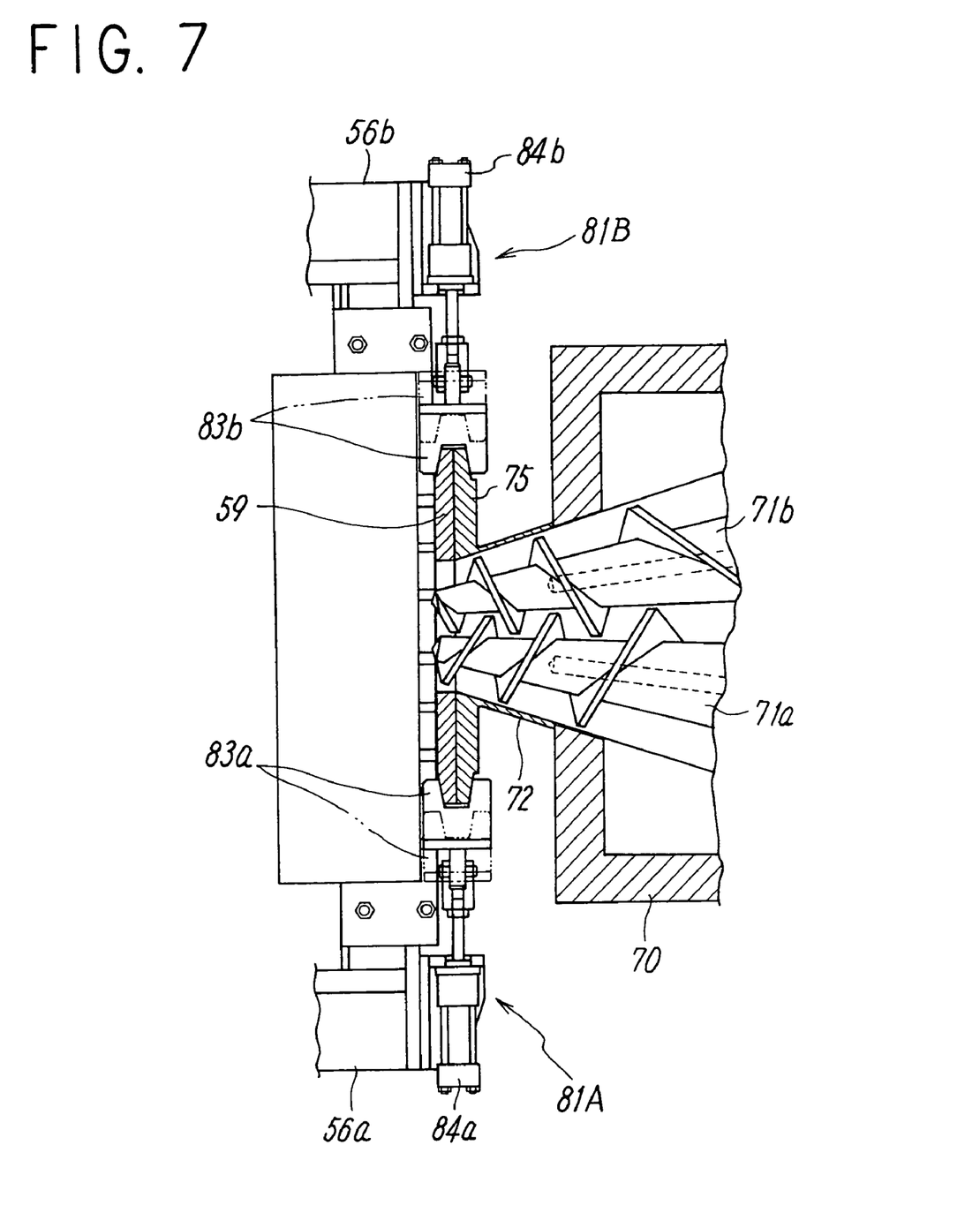
FIG. 7 is a partial enlarged plan view showing clamps provided adjacently to frames of the rubber kneading machine.

The clamps 81A, 81B provided on the frames 56a, 56b include engaging portions 83a, 83b that engage and fasten a flange 59 provided on the frames 56a, 56b and a flange 75 provided on a collet 72 at the distal end of the extrusion cylinder 70 from both sides, and hydraulic cylinders 84a, 84b that drive the engaging portions, as clearly shown in FIG. 7.

The engaging portions 83a, 83b are formed to be substantially U-shaped as observed from above, and their inner opposing surfaces are tapered toward back. With the flange 59 adjacent to the frames 56a and 56b and the flange 75 adjacent to the distal end of the extrusion cylinder 70 abutted against each other, the hydraulic cylinders 84a and 84b are driven to cause the engaging portions to engage the outer tapered surfaces of the flanges 59 and 75 from both sides thereby to fasten the extrusion cylinder 70 to the frames 56a and 56b.

The constructions of the clamps 82A and 82B will now be explained.

Figure 8:
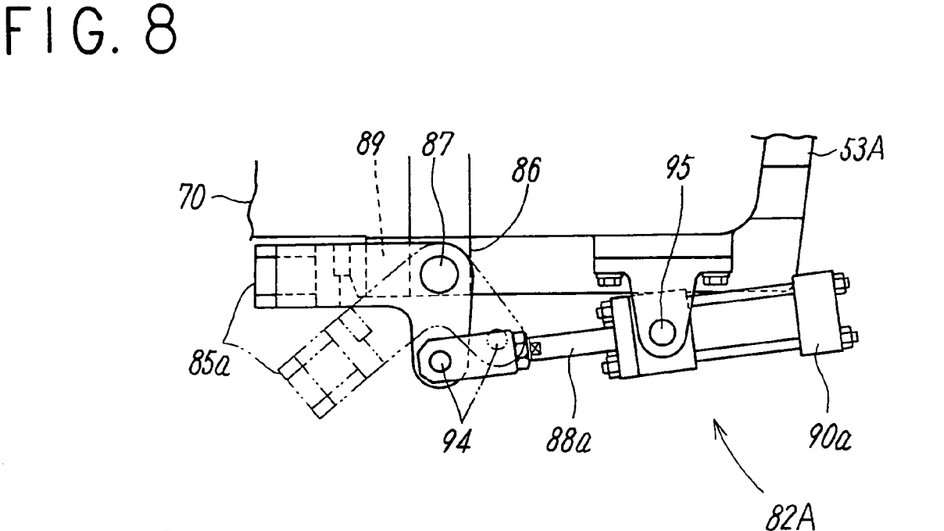
FIG. 8 is a partial enlarged plan view showing a clamp provided on a screw extruder main body of the rubber kneading machine.

In the following explanation, the clamps 82A and 82B appear to be surface-symmetrical through a plane going straight to the axis of the roll 51 at the center thereof. Hence, only the clamp 82A will be explained, and the explanation of the clamp 82B will be omitted, the auxiliary reference characteristics A being replaced by B and a being replaced by b.

Figure 9:
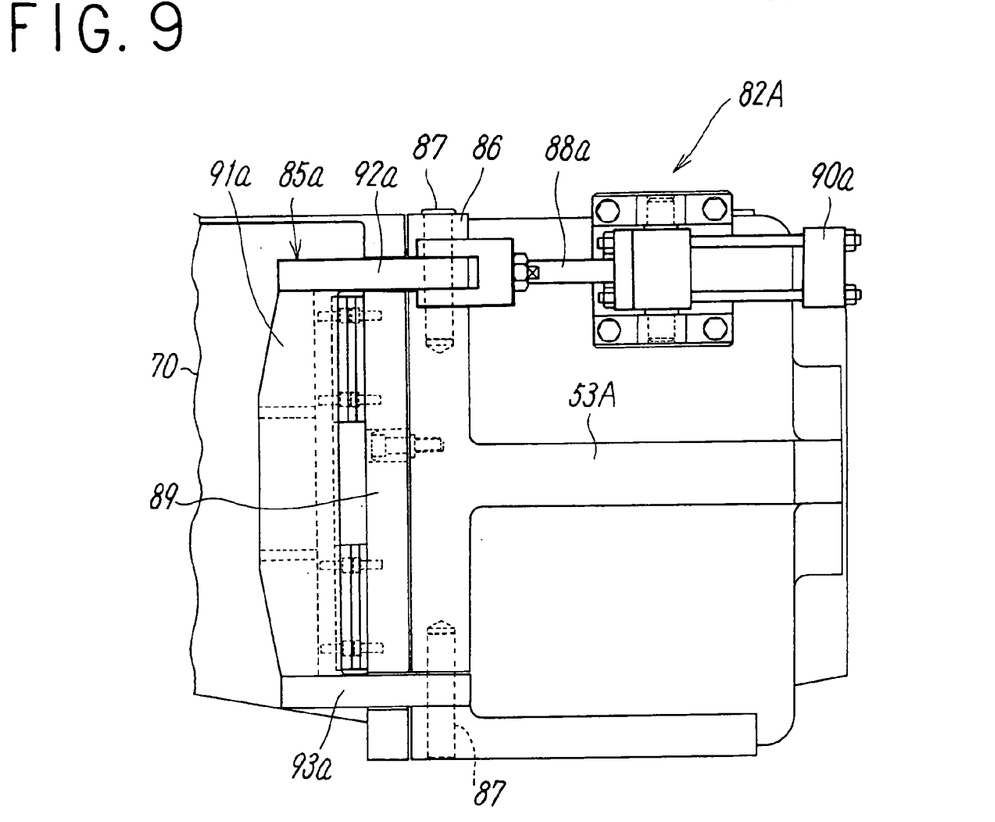
FIG. 9 is a front view of the clamp shown in FIG. 8.

The clamp 82A provided on the screw extruder main body 53A is constructed such that an engaging member 85a that engages a flange 89 at the proximal end of the extrusion cylinder 70 to fasten it is rotatively supported by a flange 86 of the screw extruder main body 53A with pins 87, and the engaging member 85a is displaced between a fastening position (the position indicated by the solid line in FIG. 8) and a releasing position (the position indicated by the chain line in FIG. 8) by a hydraulic cylinder 90a swingably installed to the screw extruder main body 53A with a pin 95, as clearly shown in FIG. 8 and FIG. 9.

Specifically, the engaging member 85a in the clamp 82A is formed to be substantially U-shaped, as observed sideways, having an engaging member main body 91a and arms 92a and 93a extending in parallel from both ends thereof (refer to FIG. 9). The distal ends of the upper and lower arms 92a and 93a are rotatively supported by the flange 86 of the screw extruder main body 53A by the pins 87. The upper arm 92a in the engaging member 85a has its distal end extended outward to be formed substantially like a hook, and a rod 88a of the hydraulic cylinder 90a is rotatively connected to the distal end thereof by a pin 94. With the flange 89 adjacent to the extrusion cylinder 70 and the flange 86 of the screw extruder main body 53A abutted each other, the hydraulic cylinder 90a is driven to swing the engaging member 85a thereby to engage the main body 91a of the engaging member 85a at a position opposing the flange 89 adjacent to the extrusion cylinder 70. Thus, the extrusion cylinder 70 can be fastened to the screw extruder main body 53A.

In the aforesaid rubber kneading machine, if the extrusion cylinder 70 is fixed to the frames 56a and 56b of the rolls 51 and 52 by the clamps 81A and 81B, the clamps 82A and 82B between the extrusion cylinder 70 and the screw extruder main body 53A are removed, and the frames 56a and 56b are driven away from the screw extruder main body 53A by the hydraulic cylinder 73, then the extrusion cylinder 70 will be separated from the screw extruder main body 53A while it remains connected with the frames 56a and 56b, and the frames 56a and 56b travel on the rail 55a on the base 55, and the extrusion cylinder 70 travels, being rested on the rail 74a on the carriage 74. Thus, the screws 71a and 71b are drawn out of the extrusion cylinder 70. When the screws 71a and 71b are pulled out, the entire screws can be cleaned. Similarly, the interior of the extrusion cylinder 70 can be cleaned and inspected.

The extrusion cylinder 70 is movably supported by the rail 74a on the carriage 74, so that lateral or vertical junction errors will not be produced when the extrusion cylinder 70 is fixed back onto the screw extruder main body 53A.

Meanwhile, if the clamps 81A and 81B between the extrusion cylinder 70 and the frames 56a and 56b are removed, and the hydraulic cylinder 73 is driven to drive the carriage 74, while the extrusion cylinder 70 and the screw extruder main body 53A are fixed by the clamps 82A and 82B, then the frames 56a and 56b travel on the rail 55a of the base 55 away from the screw extruder 53. At this time, the extrusion cylinder 70 slides on the rail 74a on the carriage 74; however, it does not actually move since it is fastened to the screw extruder main body 53A by the clamps 82A and 82B. As a result, a gap is produced between the frames 56a, 56b and the extrusion cylinder 70. This makes it possible to sufficiently clean the rolls 51 and 52 and the collet 72 of the extrusion cylinder 70 that comes in contact with the rolls.

In the rubber kneading machine having the aforesaid construction, the frames 56a, 56b supporting the upper and lower rolls 51, 52, and the distal end of the extrusion cylinder 70 are detachably installed by fastening the clamps 81A and 81B, and the extrusion cylinder 70 accommodating the screws 71a and 71b in the screw extruder 53 is detachably installed to the screw extruder main body 53A by the clamps 82A and 82B. Furthermore, the frames 56a, 56b and the extrusion cylinder 70, and the extrusion cylinder 70 and the screw extruder main body 53A can be moved toward or away from each other by driving the hydraulic cylinder 73 constituting the driving mechanism for moving the extrusion cylinder 70 and the screw extruder main body 53A. Therefore, the rolls 51, 52 and the collet 72 at the distal end of the extrusion cylinder 70 can be cleaned easily and securely by moving the frames 56a, 56b, which support the rolls 51, 52, and the extrusion cylinder 70 away from each other when, for example, the color or composition of a rubber dough is changed, while maintaining high safety for operators by the high level of closure design. Moreover, the extrusion cylinder 70 and the screw extruder main body 53A can be moved apart from each other to release the screws 71a and 71b, thus allowing the interior of the extrusion cylinder 70 and the screws 71a and 71b to be cleaned easily and securely.

Figure 10:
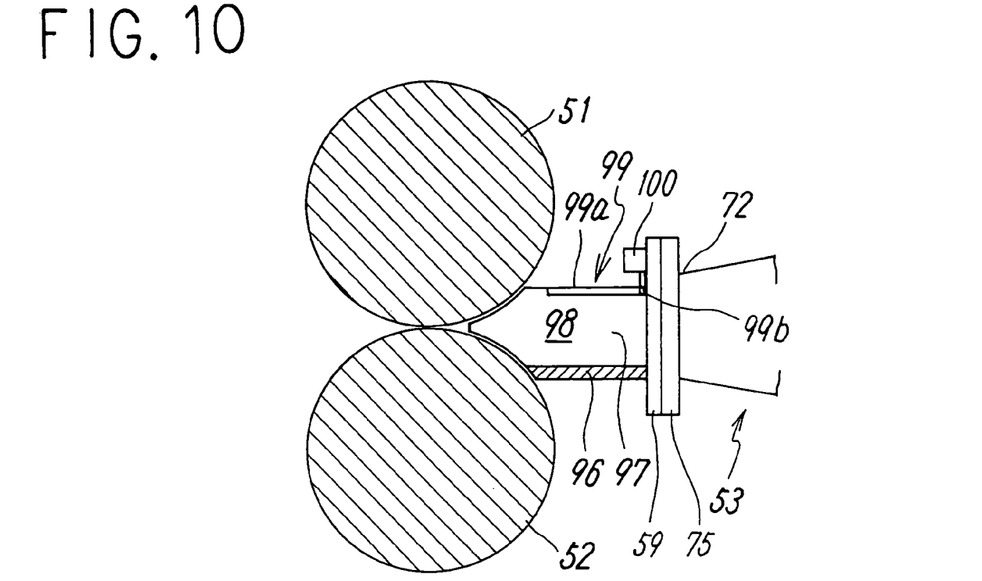
FIG. 10 is an enlarged side sectional view of an essential section for explaining a rubber reservoir of the screw extruder in the second embodiment.
Figure 11:
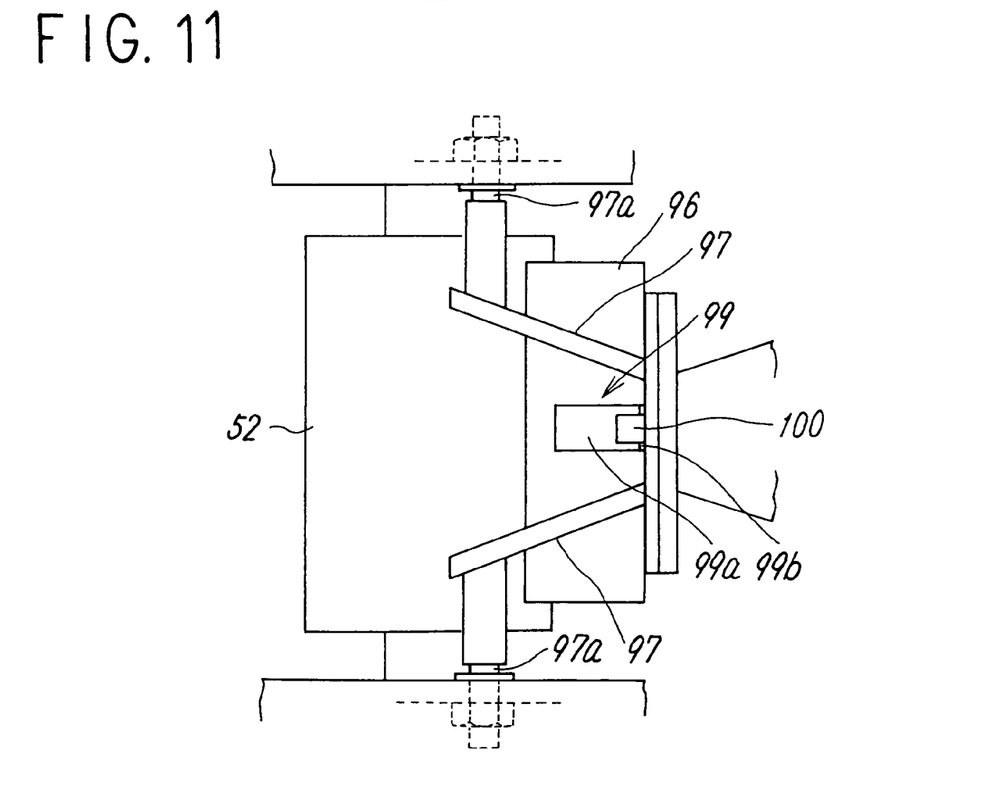
FIG. 11 is an enlarged plan view of the essential section.

In addition, as can be understood from FIG. 10 and FIG. 11, a rubber fall preventing plate 96, which is in contact with the lower roll 52 and whose entire surface is horizontal, is provided between the upper and lower rolls 51, 52 and the distal end of the collet 72 of the screw extruder 53, and upright walls 97, 97 are provided such that they are in contact with the rubber fall preventing plate 96. The interval between the walls can be freely set by interval adjustment screw rods 97a provided on right and left outer sides of the rubber fall preventing plate 96. A space 98 formed by the components serves as a rubber reservoir. A detector 99 for detecting the amount of accumulated rubber in the rubber reservoir is provided at an upper level of the open rubber reservoir. The detector 99 has a lifting plate 99a rotatively retained above the rubber reservoir by a hinge 99b. The rotational angle of the lifting plate 99a is detected by a sensor 100 in the hinge 99b so as to detect the amount of accumulated rubber. The number of revolutions of the screws 71a and 71b are adjusted on the basis of the amount of the rubber accumulated in the space 98 detected by the sensor 100 so as to allow banking of the rubber in the space 98. For the sensor 100, a potentiometer, an encoder, or a proximity switch or the lik may be used.

The rest of the construction and operation of the second embodiment is substantially the same as that of the first embodiment. Hence, like reference numerals will be assigned to like or equivalent parts and explanation thereof will be omitted.

FIG. 12 shows another embodiment (third embodiment) related to the rubber reservoir. In this third embodiment, a pair of right and left walls 101, 101 is fixedly and vertically installed on a horizontal rubber fall preventing plate 96 in contact with a lower roll 52 at the roll side of a flange 59 provided adjacently to roll frames. A rotative plate 102 for setting the sectional area of a rubber compression passage between the walls 101 and 101 is provided in contact with the walls 101 and 101 such that its position can be vertically adjusted. A detector 103 for detecting the amount of rubber accumulated is provided in a rubber reservoir formed in the vicinity of the exit of the rotative plate 102.

To explain more specifically, the rotative plate 102 is rotatively supported by a hinge 102a. The rotative plate 102 is fixed by inserting a locking pin 101b in one of many setting holes 101a provided in the walls 101 and 101 on both sides so as to perform adjustment for a rubber sheet G to have an optimum ejection thickness with respect to the walls 101 and 101. At a distal end in the vicinity of the exit of the rotative plate 102, a lifting plate 103a abutted against the upper surface of the discharged rubber sheet G is supported by a hinge 103b such that it may move up or down, and the vertical movement of the lifting plate 103a is detected by a sensor 104 of a potentiometer, an encoder, or a proximity switch or the like. The amount of accumulated rubber can be detected by detecting an angle or the like by the sensor 104, and base on an output thereof, the numbers of revolutions of the screws 71a and 71b are adjusted so as to obtain banking of rubber in the rubber reservoir.

A rubber lump is formed into a sheet of a predetermined thickness by the rotative plate 102 and discharged to the rubber reservoir. Thus, when the rubber sheet passes the rubber fall preventing plate 96 and is fed to the position where the rolls 51 and 52 mesh each other, it swirls when the upper and lower rolls 51 and 52 rotate at different speeds. This makes it easy to roll the rubber sheet out into the space between the walls 97 and 97, and also to facilitate mixing and kneading.

The rest of the construction and operation of the third embodiment are substantially the same as those of the second embodiment.

EXAMPLE

A rubber lump mixed and kneaded under a predetermined condition by a closed kneading machine (pressure kneader) was fed into the hopper 4 of the rubber kneading machine according to the first embodiment described above, and processed under the same conditions as those of a conventional roll machine. Depending on the type of rubber, the upper roll was set to be faster than the lower roll, so that the rubber wound on the upper roll, and was easily transferred by the scraper onto the belt conveyor, and then circulated to the hopper 4. The temperature of the rubber to be kneaded was set to 100° C., which is the same as that in the conventional roll kneading machine. The rubber was rolled into a sheet and taken out, and then sent out to a cooling apparatus. In about one minute after circulation was started, a powdered vulcanizing agent was added to the rubber in the hopper by hand, and the rubber was circulated for two minutes at 20 rpm, the rotational ratio of the upper and lower rolls being set at 1.15:1.0. The dispersion of the vulcanizing agent in the rubber sheet take out was checked by taking a total of 16 samples, one per 1 meter of a sheet. Results of the measurement of hardness after vulcanization indicated that variations in hardness were within ±1° (JIS hardness), making it possible to determine that the dispersion effect was satisfactory.

Unlike the rubber kneading operation using a conventional roll type, an operator mostly monitored the operation without touching the rubber during the kneading operation, and the kneading of rubber to be kneaded was finished about 15% sooner than by the conventional roll type. When the upper and lower rolls independently driven were set at different speeds, the kneading time shortened, and when they were set at the same speed, a smooth rubber sheet could be taken out. A finished sheet in this case is defined as a sheet having the same smoothness as the sheet kneaded by the conventional roll machine and has the same level of Mooney viscosity measured using a Mooney viscosity tester. In this case, it was 70±3@ ML1+4 100° C.

In the aforesaid operation of the rubber kneading machine, the time from the moment rubber starts to be transferred from the scraper of the upper roll into the hopper of the screw extruder to the moment the rubber is cut off from the upper roll and taken out was set to 1 minute for preliminary kneading and 2 minutes after adding the vulcanizing agent, the time being set by a timer. During this time, rolls having a diameter of 400 mm were run at 20 rpm, and 70 kg (60 liters) of rubber measuring 10 mm thick and 500 mm wide was subjected to four cycle of kneading. Satisfactory kneading operation was observed.

LIST OF REFERENCE NUMERALS 1 upper roll
2 lower roll
3 screw extruder
4 hopper
5 base
6a, 6b frame
7a, 7b bearing
8a, 8b bearing
9a, 9b female screw
10a, 10b screw
11 driving device
15a, 15b variable speed motor
16a, 16b decelerator
20 extrusion cylinder
21a, 21b screw
22 collet
25 case
26a, 26b bearing
27a, 27b conical gear
28 decelerator
29 motor
30 rolling wheel
31 roll moving device
33 scraper
34 belt conveyor
35 belt conveyor
37 retaining seat
38 cutter
39 belt conveyor
51 upper roll
52 lower roll
51a, 51b screw
53 screw extruder
53A screw extruder main body
54 hopper
55 base
55a rail
56a, 56b frame
57a, 57b bearing
58a, 58b bearing
59 flange
61 driving device
70 extrusion cylinder
71a, 71b screw
72 collet
73 hydraulic cylinder
74 carriage
74a rail
75 flange
80 rolling wheel
81A, 81B clamp
82A, 82B clamp
83a, 83b engaging portion
84a, 84b hydraulic cylinder
85a engaging member
86 flange
87 pin
88a rod
89 flange
90a hydraulic cylinder
91a engaging member main body
92a, 93a arm
94 pin
95 pin
96 rubber fall preventing plate
97 wall
97a interval adjustment screw rod
99b hinge
98 space
99 detector
99a lifting plate
100 sensor
101 wall
101a setting hole
101b locking pin
102 rotative plate
102a hinge
103 detector
103a lifting plate
103b hinge
104 sensor
G rubber sheet

The invention claimed is:

1. A rubber kneading machine comprising:
two horizontal rolls, including an upper roll and a lower roll, disposed vertically close to each other through an intermediary of an adjusting device for allowing a gap between the upper roll and the lower roll to be freely adjusted;
driving means for rotating the rolls;
a screw extruder including a screw extruder main body having screws and configured to supply a rubber lump fed into a hopper at a proximal end to the rolls;
a circulating mechanism for kneading and mixing rubber that is formed by feeding a rubber sheet that has left the rolls to the hopper, the circulating mechanism is constructed of a winding control means for selectively winding the rubber sheet onto the upper roll by differentiating rotational speeds of the upper and lower rolls by a variable speed motor or a decelerator, and carrying means for sending the rubber sheet coming off the upper roll to the hopper;

an extrusion cylinder accommodating the screws, the extrusion cylinder is configured to be attached to and detached from the screw extruder main body and a driving mechanism thereof;

roll frames configured to support the upper and lower rolls and a distal end of the extrusion cylinder and configured to be removable; and the driving mechanism configured to drive the roll frames and the extrusion cylinder toward or away from each other and to drive the extrusion cylinder and the screw extruder main body toward or away from each other.

2. The rubber kneading machine according to claim 1, wherein the carrying means is a conveyor.

3. The rubber kneading machine according to claim 2, wherein a belt conveyor is hung over the upper roll so as to guide the rubber sheet from the rolls onto the belt conveyor to feed the rubber sheet to the hopper.

4. The rubber kneading machine according to claim 1, wherein the carrying means has a scraper, which is in contact with the upper roll at an upper level of the upper roll, peels a rubber sheet wound thereon, and then guides the rubber sheet to the hopper.

5. The rubber kneading machine according to claim 1, wherein the carrying means is constructed of a scraper that is in contact with the upper roll at an upper portion thereof to peel off the rubber sheet wound thereon, and a conveyor for feeding the rubber sheet peeled by the scraper to the hopper.

6. The rubber kneading machine according to claim 1, wherein the screw extruder comprises two tapered screws that mesh each other and rotate, and an extrusion cylinder accommodating the two tapered screws, and the extrusion cylinder has an elliptical or gourd-shaped section and is tapered in an axial direction.

7. The rubber kneading machine according to claim 1, further comprising:

a horizontal rubber fall preventing plate in contact with the lower roll provided between the upper and lower rolls and a distal end of a collet of the screw extruder;

walls vertically provided on both sides of the rubber fall preventing plate so that the interval therebetween can be set freely;

a space formed between the walls configured to be used as a rubber reservoir; and a detector for detecting an amount of accumulated rubber provided at an upper level of the rubber reservoir, wherein a number of revolutions of the screws is adjustable on the basis of the amount of accumulated rubber detected by the detector.

8. The rubber kneading machine according to claim 1, further comprising:

a horizontal rubber fall preventing plate in contact with the lower roll provided between the upper and lower rolls and a distal end of a collet of the screw extruder;

a space, formed by vertically installing walls on both sides of the rubber fall preventing plate, configured to be used as a rubber compression passage; and a rotative plate for setting a sectional area of the rubber compression passage provided at an upper level of the space such that the rotative plate is in contact with the walls on both sides and a position of the rotative plate is vertically adjustable so as to form a rubber lump into a sheet to be supplied to the rolls by the rotative plate.

9. The rubber kneading machine according to claim 8, further comprising:

a rubber reservoir formed at an outlet side of the rotative plate including a detector for detecting an amount of rubber in the rubber reservoir, and a number of revolutions of the screws is made adjustable on the basis of the amount of rubber in the reservoir detected by the detector so as to permit banking of rubber in the space.

10. The rubber kneading machine according to claim 9, wherein the detector comprises a lifting plate rotatively retained above the rubber reservoir by a hinge, and a rotational angle of the lifting plate is detected by a sensor so as to detect the amount of rubber in the reservoir.

11. The rubber kneading machine according to claim 1, further comprising:

clamps for removably fastening the extrusion cylinder to the roll frames and the screw extruder main body, wherein the driving mechanism is driven in a direction for moving the roll frames and the screw extruder main body toward or away from each other.

12. The rubber kneading machine according to claim 1, wherein the screw extruder main body and a direct acting machine constituting the driving mechanism are disposed on a base, the roll frames are fixed on a carriage connected to the direct acting machine, and the extrusion cylinder is supported on the carriage such that the extrusion cylinder can be moved in a direction in which the roll frames are moved.

13. The rubber kneading machine according to claim 1, further comprising:

at a rubber outlet side of the upper roll, a retaining seat for a cutter configured to be pressed into contact with the upper roll and slidable with respect to a surface of the upper roll so as to cut rubber in a direction parallel to a roll axis.

* * * * *